May 13, 1941.  H. R. GRAYBILL  2,241,948
ANIMAL TRAP
Filed March 9, 1939  3 Sheets-Sheet 1

INVENTOR
Hershey Roy Graybill
BY
Louis Prevost Whitaker
ATTORNEY

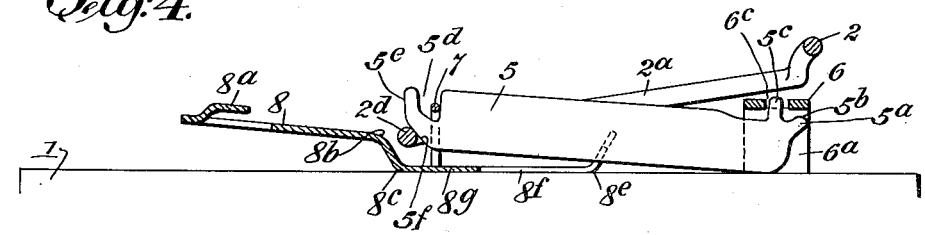
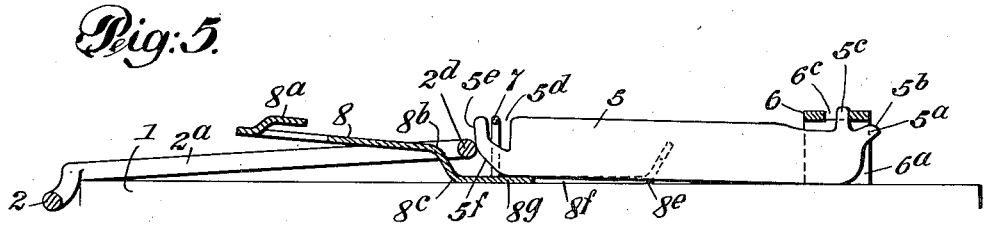
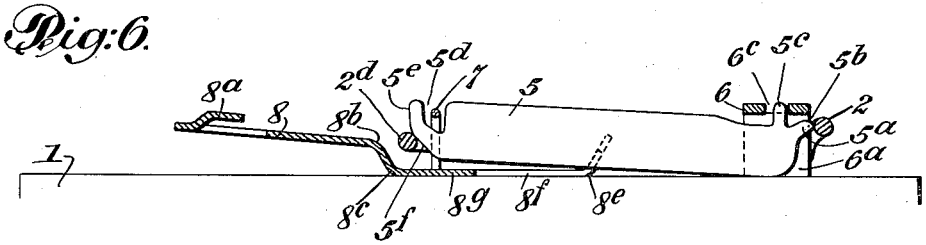
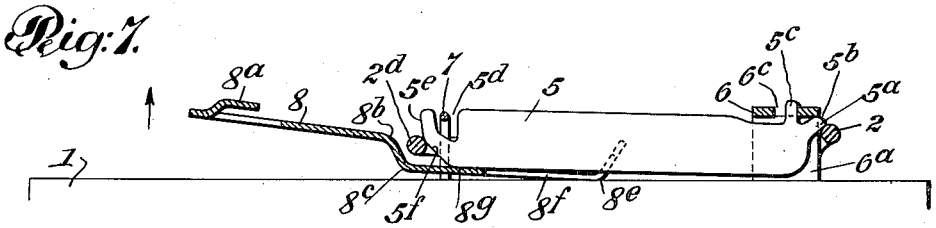
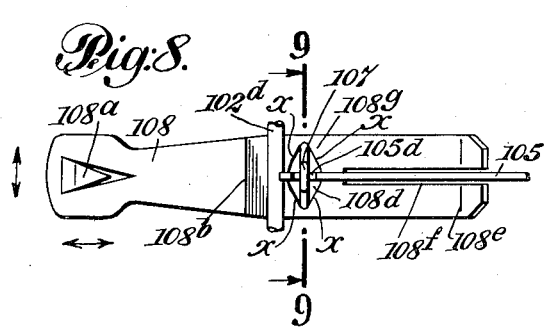
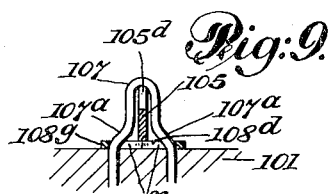

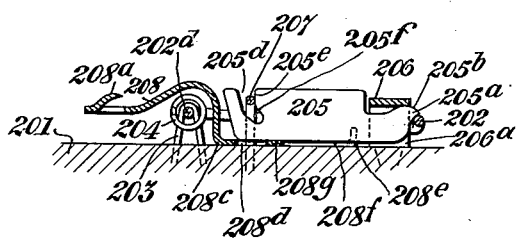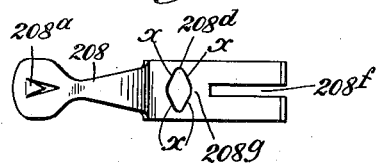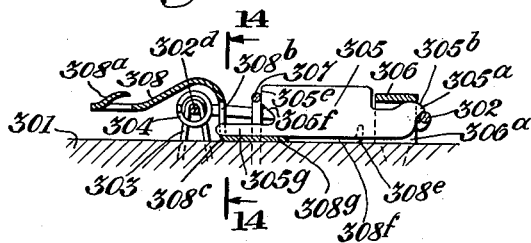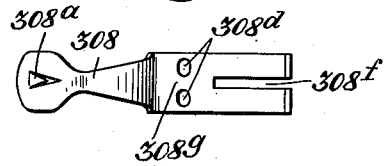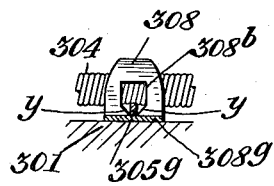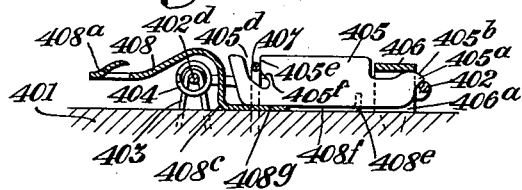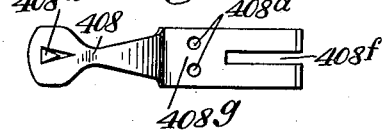

Patented May 13, 1941

2,241,948

UNITED STATES PATENT OFFICE 2,241,948

ANIMAL TRAP

Hershey Roy Graybill, Manheim, Pa., assignor to Animal Trap Company of America, Lititz, Pa., a corporation of Pennsylvania Application March 9, 1939, Serial No. 260,684

18 Claims. (Cl. 43—83.5)

My invention consists in the novel features hereinafter described, reference being had to the accompanying drawings which illustrate several forms in which I have contemplated embodying my invention, and the said invention is fully disclosed in the following description and claims.

My invention is an improved trap for rodents, particularly mice, rats and other small animals, and has for its object the production of a simple and cheap, but highly efficient trap which can be made so as to be tripped by up and down, or two-way movement of the bait pedal, and also by up, down and lateral movements, or four-way movement, and also by up, down, lateral and longitudinal movements, or in other words, universal movement of the bait pedal. My invention also contemplates certain novel features of construction and combination of parts illustrated in the accompanying drawings, and fully described in the following specification and particularly set forth in the claims.

Referring to the accompanying drawings,

Fig. 4 is a similar view showing the jaw released.

Fig. 5 is a similar view showing the trap in released position.

Fig. 6 is a similar view illustrating the positions of the parts in setting the trap.

Fig. 7 is a view similar to Fig. 3, but showing the release of the jaw by an upward movement of the bait pedal.

Fig. 8 is a plan view of a portion of the trap, showing a modification in which the release of the jaw can be effected by vertical and also horizontal movements of the bait pedal in any direction constituting a six-way release.

Fig. 9 is a detail sectional view on line 9—9 of Fig. 8.

Fig. 10 is a partial longitudinal section of a trap embodying a slight modification, especially adapted for use where the jaw is actuated by a single spring coil extending transversely of and surounding the jaw pivot, and providing a six-way release.

Fig. 11 is a plan view of the bait pedal illustrated in Fig. 10.

Fig. 12 is a view similar to Fig. 10, showing a further modification.

Fig. 13 is a plan view of the bait pedal shown in Fig. 12.

Fig. 14 is a detail sectional view on line 14—14 of Fig. 12.

Fig. 15 is a view similar to Fig. 10 showing another slight modification.

Fig. 16 is a plan view of the bait pedal shown in Fig. 15.

Figure 1:
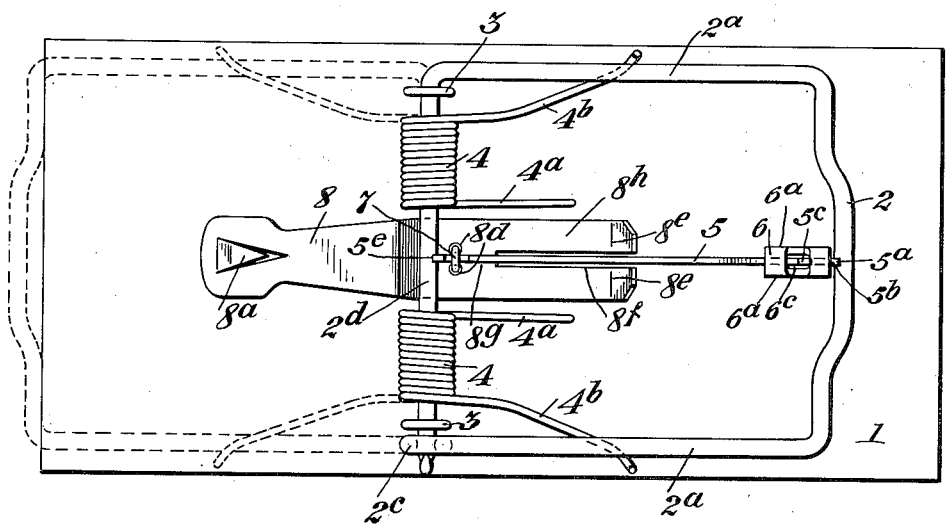
Fig. 1 is a plan view of a self setting two-way operating trap embodying my invention showing it in set position.

In the embodiment of my invention illustrated in Figs. 1 to 7 inclusive, 1 represents a base ordinarily made of wood, but which may be made of any other suitable material, upon which the various parts of the trap are mounted. The jaw is preferably of the usual bail form, comprising a single piece of metal bent to form the lateral arms $2a$, the cross bar or striker 2, and the pivot shaft $2d$, one end of which extends through an eye $2c$ at the inner end of one of the arms $2a$. The jaw is conveniently secured to the base by staples 3, 3 engaging the pivot shaft, and in this instance the shaft $2d$ is provided with two coil springs 4, each having an arm $4a$ engaging and preferably secured to the base in any desired way, the other end of the coil having an actuating arm $4b$ engaging the adjacent arm $2a$ of the jaw. The spring coils are separated from each other forming a space between their inner ends to accommodate the bait pedal.

5 represents the locking plate which is conveniently stamped from sheet metal, and is supported at its rear end by a guide 6, conveniently formed of sheet metal, bent into inverted U-shape and having parallel sides $6a$ provided at their lower ends with prongs $6b$ which can be pressed or driven into the base. The upper end of the guide 6 is formed with a slot $6c$ as shown.

The rear end of the locking plate 5 extends between the sides $6a$ of the guide 6 and is provided with a locking detent $5a$ to engage the striker 2. This detent extends rearward of the guide 6 when in operative position, and is provided on its upper edge with a cam portion $5b$ to be engaged by the striker 2 of the jaw, in setting the trap. The lower face of the detent $5a$ is inclined upwardly so that the upward pressure of the striker 2 thereon, when the trap is set, tends to force the locking bar longitudinally forwardly of the base. The locking bar is also provided with a vertical projection $5c$ which projects into the slot $6c$ of the guide 6, and limits the endwise movements of the locking bar.

At its forward end the locking bar 5 is preferably provided with a guide 7 which may conveniently be in the form of a narrow staple driven into the base, in such manner as to hold the locking bar against lateral movement, and in order to permit the forward end of the locking bar to move vertically. The locking bar is preferably provided with a notch or recess 5d adjacent to the guide, 7.

The forward end of the locking bar 5 is provided with a substantially vertical face or edge 5e forming an abutment to engage normally a part fixed with respect to the base, and resist the tendency of the locking bar to be forced forwardly by the striker pressing upwardly on the inclined face of the detent when the trap is set. In this embodiment of my invention the abutting face 5e engages the pivot shaft 2d of the jaw, but this is not essential, as hereinafter pointed out. Below the abutting face 5e the locking plate is provided with an inclined cam face 5f which engages the stationary part, as the pivot shaft in this instance, and tends to move the locking plate longitudinally and rearwardly, so as to enable the abutting face 5e to engage the stationary part.

8 represents the bait pedal provided with the usual prong 8a to hold the bait, and having a counterbalance 8h formed integrally therewith. The bait pedal has a quasi-pivotal connection with the base, and I prefer to form it by stamping the bait pedal out of sheet metal and providing it with transverse bends, as at 8b and 8c, so that the forward portion or bait carrying portion of the pedal will be supported a distance above the base, while the rear portion or counterbalance lies upon the base, and the pedal may rock upon the bend or angular portion 8c which constitutes a fulcrum portion. The bait pedal is maintained in position on the base by the staple 7, which loosely engages apertures 8d in the counterbalance portion of the bait pedal. This counterbalance portion is bent upwardly at its rear end to form a second fulcrum portion, indicated at 8e, and is provided with a longitudinal central slot 8f in alignment with the locking plate. The portion of the counterbalance forward of the slot 8f, and indicated at 8g, constitutes the trigger portion of the bait pedal, located between the fulcrum portions 8c and 8e, which will elevate the forward end of the locking plate, to release the jaw and spring the trap, by either an upward or downward movement of the bait pedal proper.

Figure 2:
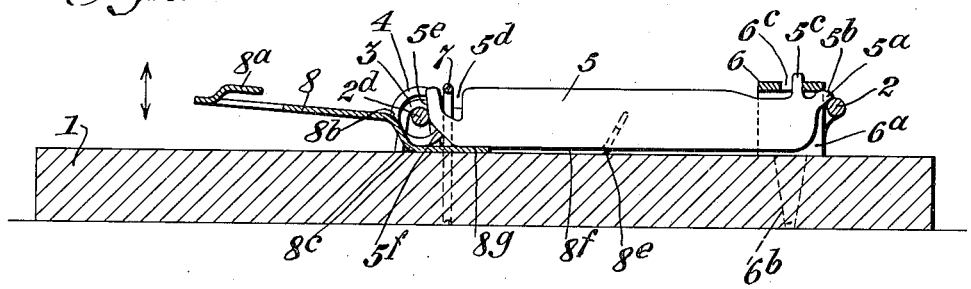
Fig. 2 is a longitudinal sectional view of the same.

The position of the parts when the trap is sprung, or released, is shown in Fig. 5. The trap is self-setting, that is, it will be brought into set position by simply swinging the jaw from released to set position. As the jaw is swung over to set position, the striker or cross bar 2 will engage the cam portion 5b of the detent 5a and will raise the forward end of the locking bar, as shown in Fig. 6, so as to temporarily disengage the abutting edge 5e from the stationary part or shaft 2d, and allow the locking bar to move forwardly enough to enable the striker to pass beneath the detent 5a (see Fig. 6), when the forward end of the locking plate will drop by gravity to its normal position, the cam portion 5f forcing the locking plate rearwardly and enabling the abutting face 5e to again engage the pivot shaft 2d, as shown in Figs. 1 and 2, wherein the trap is shown in the set position.

Figure 3:
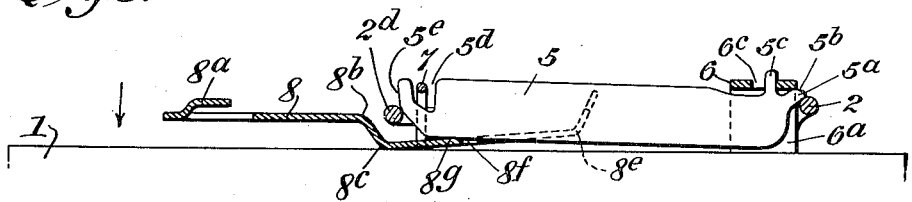
Fig. 3 is a detail view showing the bait pedal depressed to release the trap.

If the rodent, in its efforts to remove the bait, depresses the bait pedal, as indicated in Fig. 3, the pedal will pivot adjacent the fulcrum point 8c and the trigger portion 8g will elevate the forward end of the locking plate so as to disengage the abutting face 5e from the shaft 2d, when the locking plate will be forced forward by the engagement of the striker 2 with the detent, thus releasing the jaw and springing the trap.

If the forward end of the pedal is raised by the rodent, the pedal will pivot adjacent to the point where its rear fulcrum 8e engages the base, and the trigger portion 8g will raise the forward end of the locking bar and spring the trap.

If it is desired to make the trap so that it can be sprung by lateral movement in either direction, and also by longitudinal movement in either direction, thus making it a six-way, or universal release trap, this can be readily accomplished as indicated in Figs. 8 and 9, in which the parts corresponding to those previously described are given the same reference numerals with the addition of 100. As shown in these figures, the guiding staple, here indicated at 107, is provided adjacent to the base 101 with inclined shoulders forming cams 107a, 107a, and the trigger portion 108g is provided with a diamond shaped slot 108d having oppositely inclined edges x, x at each end to engage the shoulders 107a of the guide or staple 107. As will be readily seen a lateral movement of the pedal 108 in either direction will cause one of the inclined edges x of the slot 108d to ride up on one of the shoulders 107a, thus raising the forward end of the locking plate and releasing the jaw, if the trap is set.

It will also be seen that if the pedal is moved longitudinally, either forwardly or backwardly, the inclined edges of the slot will ride up the inclined shoulders of the staples and raise the trigger so as to release the trap. This makes a trap which is released by any movement of the bait pedal, constituting what may be termed a universal release.

In Figs. 10 and 11 I have shown a slightly modified form of trap, which is particularly adaptable for use in cases where a single coiled spring surrounding the pivot shaft of the jaw extends substantially from one end of the shaft to the other. In these figures the parts corresponding to those shown in Figs. 1 to 7 are given the same reference numerals with the addition of 200. In this embodiment the bait pedal 208 is arched so as to extend over the spring 204, and then extends downwardly to the base, where it connects with the integral counterbalance portion, at the angular corner or fulcrum 208c, in rear of which is the trigger portion 208g and fulcrum 208e. The forward end of the locking plate is provided with the substantially vertical locking face 205e and inclined cam face 205f, which together form the rear edge of the slot 205d, which receives the staple or guide. The guide 207 is preferably formed like the staple 107 (Fig. 9) with inclined shoulders, as indicated at 107a in Fig. 9, and extends through an aperture 208d having the cam edges x, x. The staple or guide 207 is so located that it engages the locking face 205e when the locking plate is in set position. This form of the trap operates exactly as does the form shown in Figs. 8 and 9 and previously described, and the trap will be sprung by movement of the locking lever in any direction.

Figs. 12, 13 and 14 show a form of trap substantially like that illustrated in Figs. 10 and 11, except for variations hereinafter described. In Figs. 12, 13 and 14 the parts corresponding to those shown in Figs. 1 to 7 are given the same reference numerals with the addition of 300. In this form of the trap the staple 307 is of ordinary form and its legs extend through enlarged apertures 308d, which permit lateral movement of the bait pedal. In this instance the bait pedal 308 has its downwardly extending portion in rear of the jaw pivot provided with an aperture 308b, provided at its lower end with oppositely inclined cam portions y—y. The locking plate 305 is provided at its forward end with an extension 305g which projects into the aperture 308b and normally rests between the inclined cam portions y—y.

With this construction it will be seen that the forward end of the locking plate will be raised by a movement of the bait pedal 308 upwardly or downwardly, and also laterally in either direction, as any lateral movement of the bait pedal will cause one or the other of the inclined faces y—y of the aperture 308b to lift the extension 305g of the locking plate and release the jaw.

In Figs. 15 and 16, in which the parts corresponding with those referred to in Figs. 1 to 7 are given the same reference numerals with the addition of 400, there is shown a simple form of trap operable only by vertical movements of the bait pedal 408. The construction is substantially like that illustrated in Figs. 10 and 11, except that the guiding staple 407 is of usual form, embraces the locking plate 405, and extends through loosely fitting apertures 408d, it being unnecessary in this case to allow any lateral movement of the bait pedal. Otherwise the trap is constructed and operates exactly like that shown in Figs. 10 and 11, except that obviously the locking plate will be lifted only by vertical movements of the bait pedal, making it in other words a two-way trap.

In this case, as in Figs. 10 to 14, the locking face 405e of the locking plate engages the upper end of the staple 407, and the forward end of the bait pedal 408 is curved so as to pass over the pivoted shaft 402d of the jaw.

It will be noted that by the use of the slot, indicated at 8f, in the rear or counterbalance portion of the bait pedal in Figs. 1 to 7, and correspondingly in the other figures, the same easy release of the trap is obtained by the downward movement of the forward end of the bait pedal as if the counterbalance terminated at the forward end of the slot, while the construction provides a long reach between the trigger portion 8g and the rear fulcrum point 8e when the forward end of the bait pedal is raised above its normal position, thus releasing the trap with considerably less movement than would be required if the counterbalance portion had its rear fulcrum at the point represented by the forward end of the slot 8f.

What I claim and desire to secure by Letters Patent is:

1. In a trap, the combination of a base, a pivoted spring actuated jaw, a longitudinally movable locking plate having a detent provided with a cam face for engaging the jaw in set position, and tending to move said plate in a direction to release said jaw, and a cam face for engaging the jaw in setting the trap to move it in the same direction, a coacting part secured against movement longitudinally of the base, said locking plate having a locking portion to engage in set position said coacting part to lock the locking plate against movement longitudinally of the base, and a contiguous cam portion for engaging said coacting part and moving said locking plate longitudinally into set position, said locking plate being normally held by gravity in set position at all times except during the setting and release of the jaw, and a bait pedal provided with a trigger portion for engaging the locking plate to disengage its locking portion from said coacting part.

2. In a trap, the combination of a base, a pivoted spring actuated jaw, a longitudinally movable locking plate provided at its rear end with a detent having an upwardly inclined cam face to engage the jaw in set position, and tending to move the locking plate forwardly out of engagement therewith and having a downwardly inclined cam face to engage the jaw in setting the trap, a coacting part secured against movement longitudinally of the base, said locking plate being provided adjacent to its forward end with an abutting face for engaging when in set position said coacting part, and an inclined cam face in rear of said abutting face for engaging said fixed part to effect the rearward movement of the locking plate into set position, means for guiding the locking plate and limiting its longitudinal movement, and a rocking bait pedal having a trigger portion for engaging and raising the forward end of said locking plate, said locking plate being held normally by gravity at all times in set position except during the setting and release of the jaw.

3. In a trap, the combination of a base, a pivoted spring actuated jaw, a longitudinally movable locking plate having a detent provided with a cam face for engaging the jaw in set position, and tending to move said plate in a direction to release said jaw, and a cam face for engaging the jaw in setting the trap to move it in the same direction, a coacting part secured against movement longitudinally of the base, said locking plate having a locking portion to engage in set position said coacting part to hold the locking plate against movement longitudinally of the base, and a contiguous cam portion for engaging said coacting part and moving said locking plate longitudinally into set position, said locking plate being normally held by gravity in set position at all times except during the setting and release of the jaw, and a rocking bait pedal having a trigger portion extending beneath the forward end of said locking lever for raising the same.

4. In a trap, the combination of a base, a pivoted spring actuated jaw, a longitudinally movable locking plate having a detent provided with a cam face for engaging the jaw in set position, and tending to move said plate in a direction to release said jaw, and a cam face for engaging the jaw in setting the trap to move it in the same direction, a coacting part secured against movement longitudinally of the base, said locking plate having a locking portion to engage in set position said coacting part to hold the locking plate against movement longitudinally of the base, and a contiguous cam portion for engaging said coacting part and moving said bait pedal longitudinally into set position, said locking plate being normally held by gravity in set position at all times except during the setting and release of the jaw, means for guiding and limiting the longitudinal movement of said locking plate, and a rocking bait pedal having a trigger portion extending beneath the forward end of said locking lever for raising the same.

5. In a trap, the combination of a base, a pivoted spring actuated jaw, a longitudinally movable locking plate having a detent provided with a cam face for engaging the jaw in set position, and tending to move said plate in a direction to release said jaw, and a cam face for engaging the jaw in setting the trap to move it in the same direction, a coacting part secured against movement longitudinally of the base, said locking plate having a locking portion to engage in set position said coacting part to hold the locking plate against movement longitudinally of the base, and a contiguous cam portion for engaging said coacting part and moving said locking plate longitudinally into set position, said locking plate being normally held by gravity in set position at all times except during the setting and release of the jaw, and a rocking bait pedal having a portion extending along said base and provided with fulcrum portions spaced longitudinally of the base, and provided with a trigger portion located between said fulcrum portions for engaging and raising the forward end of said locking plate to release the jaw by upward or downward rocking movement of the bait pedal.

6. In a trap, the combination of a base, a pivoted spring actuated jaw, a longitudinally movable locking plate having a detent provided with a cam face for engaging the jaw in set position, and tending to move said plate in a direction to release said jaw, and a cam face for engaging the jaw in setting the trap to move it in the same direction, a coacting part secured against movement longitudinally of the base, said locking plate having a locking portion to engage in set position said coacting part to hold the locking plate against movement longitudinally of the base and a contiguous cam portion for engaging said coacting part and moving said locking plate longitudinally into set position, said locking plate being normally held by gravity in set position at all times except during the setting and release of the jaw, and a rocking bait pedal having a portion extending along said base and provided with fulcrum portions spaced longitudinally of the base, and provided with a trigger portion located between said fulcrum portions for engaging and raising the forward end of said locking plate to release the jaw by upward or downward rocking movement of the bait pedal, said bait pedal being provided with opposite angularly disposed portions for effecting the raising of the locking bar by lateral movements of the bait pedal, and means for securing the bait pedal to the base, permitting said rocking and lateral movements thereof.

7. In a trap, the combination of a base, a pivoted spring actuated jaw, a longitudinally movable locking plate having a detent provided with a cam face for engaging the jaw in set position, and tending to move said plate in a direction to release said jaw, and a cam face for engaging the jaw in setting the trap to move it in the same direction, a coacting part secured against movement longitudinally of the base, said locking plate having a locking portion to engage in set position said coacting part to hold the locking plate against movement longitudinally of the base, and a contiguous cam portion for engaging said coacting part and moving said locking plate longitudinally into set position, said locking plate being normally held by gravity in set position at all times except during the setting and release of the jaw, and a rocking bait pedal having a trigger portion extending beneath the forward end of said locking lever for raising the same, and guiding means for said locking bar including a guide extending through the trigger portion of said bait pedal, for securing it in connection with the base.

8. In a trap, the combination of a base, a pivoted spring actuated jaw, a longitudinally movable locking plate having a detent provided with a cam face for engaging the jaw in set position, and tending to move said plate in a direction to release said jaw, and a cam face for engaging the jaw in setting the trap to move it in the same direction, a coacting part secured against movement longitudinally of the base, said locking plate having a locking portion to engage in set position said coacting part to hold the locking plate against movement longitudinally of the base, and a contiguous cam portion for engaging said coacting part and moving said locking plate longitudinally into set position, said locking plate being normally held by gravity in set position at all times except during the setting and release of the jaw, and a rocking bait pedal having a trigger portion extending beneath the forward end of said locking lever for raising the same, said trigger portion being provided with an aperture having oppositely disposed cam edges, and a guide embracing said locking plate extending through said aperture in said trigger portion and provided with inclined shoulders for engaging said cam edges, to release the trap by horizontal movement of the pedal in any direction.

9. In a trap, the combination of a base, a pivoted spring actuated jaw, a longitudinally movable locking plate having a detent provided with a cam face for engaging the jaw in set position, and tending to move said plate in a direction to release said jaw, and a cam face for engaging the jaw in setting the trap to move it in the same direction, a coacting part secured against movement longitudinally of the base, said locking plate having a locking portion to engage in set position said coacting part to hold the locking plate against movement longitudinally of the base, and a contiguous cam portion for engaging said coacting part and moving said locking plate longitudinally into set position, said locking plate being normally held by gravity in set position at all times except during the setting and release of the jaw, a rocking bait pedal having a counterbalance portion extending beneath the forward end of the locking plate, and having fulcrum portions spaced longitudinally of the base, and a trigger portion between said fulcrum portions provided with an aperture having oppositely inclined cam edges, and a guide for said locking plate embracing said plate and extending through said aperture and provided with shoulders for engaging said cam edges of said aperture to release the jaw by horizontal movement of the pedal in any direction.

10. In a trap, the combination of a base, a pivoted spring actuated jaw, a longitudinally movable locking plate having a detent provided with a cam face for engaging the jaw in set position, and tending to move said plate in a direction to release said jaw, and a cam face for engaging the jaw in setting the trap to move it in the same direction, said locking plate having a substantially vertically disposed locking portion, and a contiguous downwardly and rearwardly inclined cam portion, a rocking bait pedal having a counterbalance portion extending beneath the forward end of the locking plate, and having a trigger portion, guiding means for said locking plate including a guiding device embracing said locking plate, and located in position to engage the locking portion thereof when the locking plate is in set position, said locking plate being normally held by gravity in set position at all times except during the setting and release of the trap.

11. In a trap, the combination of a base, a pivoted spring actuated jaw, a longitudinally movable locking plate having a detent provided with a cam face for engaging the jaw in set position, and tending to move said plate in a direction to release said jaw, and a cam face for engaging the jaw in setting the trap to move it in the same direction, said locking plate having a substantially vertically disposed locking portion and a contiguous downwardly and rearwardly extending cam portion, a rocking bait pedal having its forward portion arched over the pivotal axis of the jaw, and a counterbalance portion extending beneath the forward end of the locking plate and provided with fulcrum portions spaced longitudinally of the base, said counterbalance portion having a slotted portion at its rear end and a trigger portion forward of said slotted portion and between said fulcrum portions, guiding devices for said locking plate, including a guiding device embracing said locking plate secured to said base in position to normally engage the locking face thereof and extending loosely through the said trigger portion.

12. In a trap, the combination of a base, a pivoted spring actuated jaw, a longitudinally movable locking plate having a detent provided with a cam face for engaging the jaw in set position, and tending to move said plate in a direction to release said jaw, and a cam face for engaging the jaw in setting the trap to move it in the same direction, said locking plate having a substantially vertically disposed locking portion and a contiguous downwardly and rearwardly extending cam portion, a rocking bait pedal having its forward portion arched over the pivotal axis of the jaw, and a counterbalance portion extending beneath the forward end of the locking plate and provided with fulcrum portions spaced longitudinally of the base, said counterbalance portion having a slotted portion at its rear end and a trigger portion forward of said slotted portion and between said fulcrum portions, guiding devices for said locking plate, including a guiding device embracing said locking plate secured to said base in position to normally engage the locking face thereof, and extending loosely through the said trigger portion, said trigger portion being provided with an aperture having opposite angularly disposed cam portions and said guiding device being provided with angular shoulders for engaging said angularly disposed cam portions.

13. In a trap, the combination of a base, a pivoted spring actuated jaw, a longitudinally movable locking plate having a detent provided with a cam face for engaging the jaw in set position, and tending to move said plate in a direction to release said jaw, and a cam face for engaging the jaw in setting the trap to move it in the same direction, said locking plate having a substantially vertically disposed locking portion and a contiguous downwardly and rearwardly extending cam portion, a rocking bait pedal having its forward portion arched over the pivotal axis of the jaw, and a counterbalance portion extending beneath the forward end of the locking plate and provided with fulcrum portions spaced longitudinally of the base, said counterbalance portion having a slotted portion at its rear end and a trigger portion forward of said slotted portion and between said fulcrum portions, guiding devices for said locking plate, including a guiding device embracing said locking plate secured to said base in position to normally engage the locking face thereof, and extending loosely through the said trigger portion, said bait pedal having a vertically disposed portion provided with an aperture having oppositely inclined cam edges, and said locking bar being provided with a forwardly extending portion engaging said aperture between the cam edges thereof.

14. In a trap, the combination of a base, a pivoted spring actuated jaw, a longitudinally movable locking plate having a detent for holding the jaw in set position, and a locking portion, a coacting part held against movement longitudinally of the base for engaging said locking portion in the set position of the trap, a rocking bait pedal having a trigger portion extending beneath the forward end of said locking plate, and a guide embracing said locking plate and extending through apertured portions in said trigger portion.

15. In a trap, the combination of a base, a pivoted spring actuated jaw, a longitudinally movable locking plate having a detent for holding the jaw in set position, and a locking portion, a coacting part held against movement longitudinally of the base for engaging said locking portion in the set position of the trap, a rocking bait pedal having a trigger portion extending beneath the forward end of said locking plate, said trigger portion being provided with an aperture having cam edges, and a guide embracing said locking plate extending through said aperture in said trigger portion and provided with inclined shoulders for engaging said cam edges to release the trap by horizontal movement of the pedal in any direction.

16. In a trap, the combination of a base, a pivoted spring actuated jaw, a longitudinally movable locking plate having a detent for holding the jaw in set position, and a locking portion, a coacting part held against movement longitudinally of the base for engaging said locking portion in the set position of the trap, a rocking bait pedal having a trigger portion extending beneath the forward end of said locking plate, and having a fulcrum portion forward of and also in rear of said trigger portion, said trigger portion being provided with an aperture having oppositely disposed cam edges, and said locking plate being provided with guiding means extending through said aperture in said trigger portion and provided with inclined shoulders for engaging said cam edges to release the trap by horizontal movement of the pedal in any direction.

17. In a trap, the combination of a base, a pivoted spring actuated jaw, a longitudinally movable locking plate having a detent for holding the jaw in set position, and a locking portion, guiding means for the locking portion including a guiding device held in fixed relation to the base embracing the locking plate and located in position to engage the locking portion thereof in the set position of the trap, and a bait pedal loosely held by said guiding means and having a trigger portion extending beneath the locking portion of the locking plate for disengaging it from said guiding means.

18. In a trap, the combination of a base, a pivoted spring actuated jaw, a longitudinally movable locking plate having a detent for holding the jaw in set position, and a locking portion, guiding means for the locking portion including a guiding device held in fixed relation to the base embracing the locking plate and located in position to engage the locking portion thereof in the set position of the trap, and a bait pedal loosely held by said guiding means and having a trigger portion extending beneath the locking portion of the locking plate for disengaging it from said guiding means, said trigger portion having an aperture therein provided with cam edges for engaging said guiding device and said guiding device being provided with inclined cam portions for engaging said cam edges of said aperture and raising the trigger portion by horizontal movement of the bait pedal in any direction.

HERSHEY ROY GRAYBILL.